May 13, 1930.  W. L. BETTEX ET AL  1,758,555
BEAN HARVESTER
Filed Jan. 14, 1929
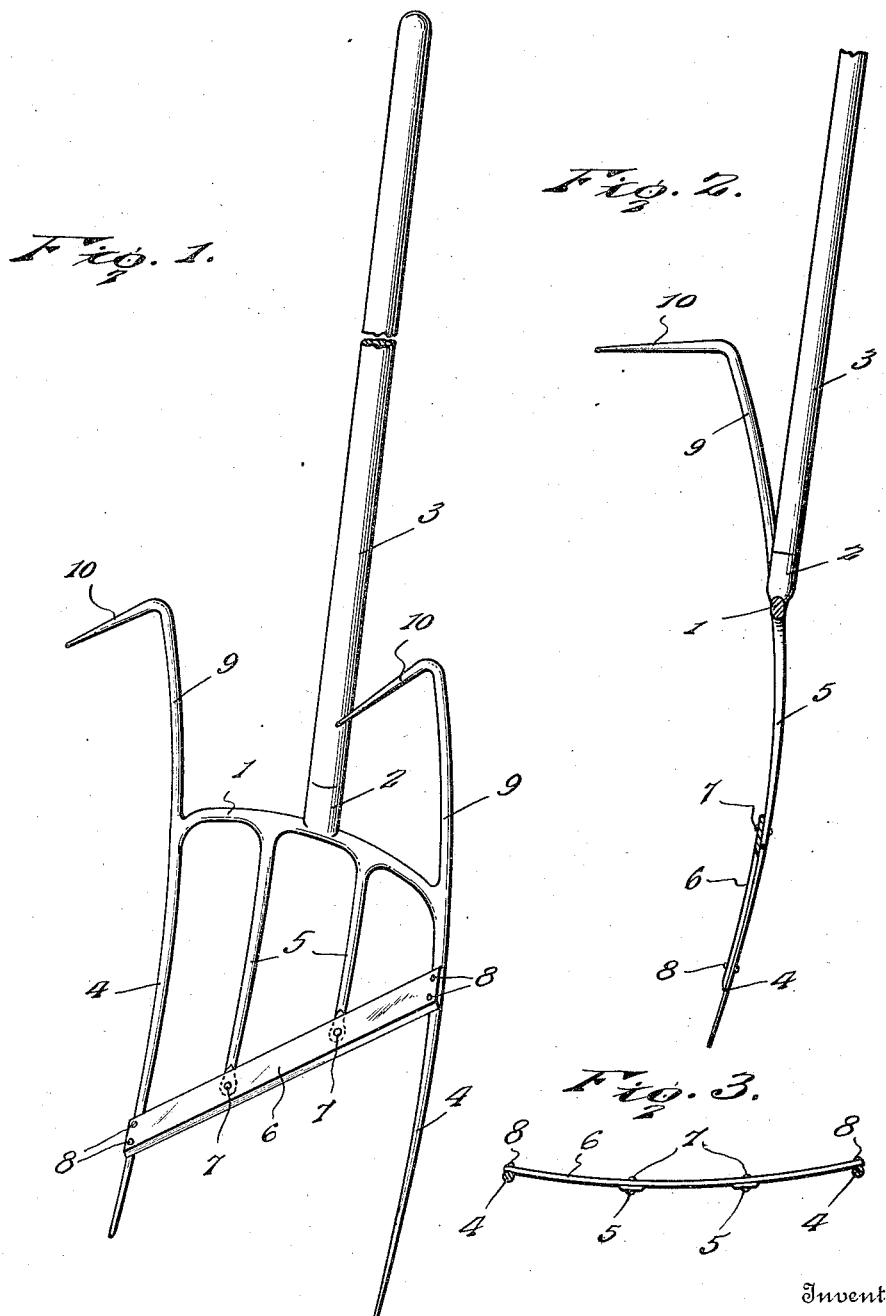
Inventors
W. L. Bettex.
C. L. Brenner.
By Lacey & Lacey, Attorneys Patented May 13, 1930

1,758,555

UNITED STATES PATENT OFFICE

WILLIAM L. BETTEX AND CHARLES L. BRENNER, OF IDALIA, COLORADO

BEAN HARVESTER

Application filed January 14, 1929. Serial No. 332,342.

This invention relates to harvesting implements and more particularly to an implement by means of which bean vines and the like may have their stalks easily cut close to the ground and the vines piled upon a field where they are to remain until removed. When large fields are planted with beans and the like, machines are used to harvest the crop but when only a few acres are planted it is customary to harvest the beans by pulling the vines from the ground. This is very laborious work as it is necessary to lean over in order to grasp the vines and it also requires a great deal of time.

Therefore, one object of the invention is to provide an implement resembling a pitch fork which may be operated while standing and by means of which the stalks may be easily cut close to the ground and the vines lifted and formed into piles upon a field.

Another object of the invention is to so form the tines of the fork that a blade carried thereby may be very easily engaged with the stalk of a plant and also to so dispose the blade that when the fork is moved forwardly the blade will very easily cut through the stalk of the plant and the vines or plant moved onto the fork back of the cutting knife.

Another object of the invention is to provide the fork with means for limiting rearward movement of the vines when cut and thereby allow a number of vines to be successively cut and the cut vines prevented from slipping off the fork while cutting other vines or lifting the vines from the ground in order to deposit them in a pile upon the field.

The invention is illustrated in the accompanying drawing, wherein—

Figure 1 is a perspective view of the improved bean harvester,

Fig. 2 is a longitudinal sectional view through the harvester, and

Fig. 3 is a transverse sectional view.

This improved bean harvester includes a head resembling a pitch fork and having a cross bar 1 from which extends a socket 2 which projects rearwardly from the head intermediate its length and is adapted to receive the forward end of a handle 3. The handle may be of any length desired but it is preferably of such length that either a tall or a short person may grasp the handle and operate the device while standing. Tines 4 which may be referred to as side tines extend forwardly from the ends of the cross bar and the cross bar also carries intermediate tines 5 which project forwardly from the cross bar between the side tines at opposite sides of the socket 2. These intermediate tines are of less length than the side tines but one is of somewhat greater length than the other and at their forward ends the intermediate tines are flattened in order to provide good supports for the intermediate portion of a cutting blade or knife 6 which extends transversely across the tines and is firmly secured to the intermediate tines and side tines by fasteners, such as rivets 7 and 8. It should be noted that the blade extends diagonally, as clearly shown in Fig. 1, so that, when it is engaged with the stalk of a vine close to the ground and the implement moved forwardly, a very good cutting action will take place and thereby allow the blade to easily cut through the stalk of the plant. It should also be noted that the tines are curved longitudinally, as shown in Fig. 2, and the blade is bowed downwardly, as shown in Fig. 3. By this arrangement the tines may be easily passed beneath a vine and the blade moved into engagement with the stalk of a vine without being liable to catch in the ground. When a vine is cut, it moves rearwardly onto the fork back of the blade and as successive vines are cut, they also move rearwardly. It is desired to prevent the vines from moving rearwardly and dropping upon the ground and we have, therefore, provided arms 9 which project rearwardly from the ends of the cross bar 1. These arms 9 extend rearwardly in alinement with the side tines 4 and they are curved longitudinally to conform to the curvature of the tines, as clearly shown in Fig. 2. The rear end portions of the arms are bent to form bills 10 which project upwardly from these arms and constitute abutments to be engaged by the vines as they are moved rearwardly and thereby prevent the vines from dropping at opposite sides of the handle and becoming entangled about the handle. It will thus be seen that with this implement a number of vines may be successfully cut and after the fork or head portion of the implement is loaded to its capacity the vines very easily lifted and placed in a pile upon a field where they will remain until removed.

Having thus described the invention, we claim:

1. An implement of the character described comprising a head including a cross bar, tines extending forwardly from the ends of said cross bar, tines extending forwardly from the cross bar intermediate its ends and being of less length than the first tines, said tines being curved longitudinally, a cutting blade extending diagonally across said tines and bowed downwardly and secured to the tines, and arms extending rearwardly from said cross bar and having their free rear end portions bent upwardly.

2. An implement of the character described comprising a head including forwardly extending tines spaced transversely from each other, a cutting blade extending transversely of said tines, and rearwardly extending arms having their free rear end portions bent to extend upwardly.

3. An implement of the character described comprising a head including a cross bar, a handle receiving socket extending rearwardly from said cross bar intermediate the ends thereof, side tines extending forwardly from the ends of said cross bar, intermediate tines extending forwardly from said cross bar at opposite sides of said socket and being of less length than the side tines, said tines being curved longitudinally, a longitudinally bowed cutting blade extending diagonally across said tines and secured upon the same, and arms extending rearwardly from the ends of said cross bar in alinement with the side tines and following the curvature thereof, said arms having their free rear end portions bent upwardly to form abutments.

In testimony whereof we affix our signatures.

WILLIAM L. BETTEX. [L. S.]
CHARLES L. BRENNER. [L. S.]